United States Patent
Niimi et al.

(10) Patent No.: US 9,873,352 B2
(45) Date of Patent: Jan. 23, 2018

(54) VEHICLE CONTROL SYSTEM AND CONTROL METHOD

(71) Applicant: TOYOTA JIDOSHA KABUSHIKI KAISHA, Toyota-shi, Aichi-ken (JP)

(72) Inventors: Yoshitaka Niimi, Susono (JP); Masaki Okamura, Toyota (JP); Shintaro Tsujii, Chiryu (JP); Wanleng Ang, Gotemba (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/031,518

(22) PCT Filed: Oct. 24, 2014

(86) PCT No.: PCT/IB2014/002215
§ 371 (c)(1),
(2) Date: Apr. 22, 2016

(87) PCT Pub. No.: WO2015/059554
PCT Pub. Date: Apr. 30, 2015

(65) Prior Publication Data
US 2016/0250947 A1 Sep. 1, 2016

(30) Foreign Application Priority Data
Oct. 25, 2013 (JP) ................. 2013-222575

(51) Int. Cl.
*B60L 3/00* (2006.01)
*B60L 15/20* (2006.01)
(Continued)

(52) U.S. Cl.
CPC .............. *B60L 15/20* (2013.01); *B60L 3/003* (2013.01); *B60L 3/0061* (2013.01);
(Continued)

(58) Field of Classification Search
None
See application file for complete search history.

(56) References Cited

U.S. PATENT DOCUMENTS

| 5,686,839 A | 11/1997 | Takagi | |
|---|---|---|---|
| 2010/0076661 A1* | 3/2010 | Ueoka | B60L 3/0038 701/84 |

(Continued)

FOREIGN PATENT DOCUMENTS

| GB | 2474321 A | 4/2011 |
|---|---|---|
| JP | H07-241002 A | 9/1995 |

(Continued)

*Primary Examiner* — Nicholas Kiswanto
*Assistant Examiner* — Tamara Weber
(74) *Attorney, Agent, or Firm* — Andrews Kurth Kenyon LLP

(57) ABSTRACT

A control system for a vehicle including a three-phase AC motor, a first switching device, a second switching device, and a power converter, is provided. The control system includes a short-circuit detector, and an ECU. The ECU is configured to: (a) control the power converter, when it is determined that the vehicle is stopped, so as to place, the power converter in a predetermined condition in which one of the first switching device and the second switching device for all of the three phases is in an OFF state, and (b) control the power converter when the short-circuit detector detects a short circuit in one of the first switching devices and the second switching devices, so that said one of the first and second switching devices in which the short circuit is detected provides the ON state in the predetermined condition.

2 Claims, 12 Drawing Sheets

(51) Int. Cl.
*B60L 7/00* (2006.01)
*H02P 6/24* (2006.01)
*B60L 11/18* (2006.01)

(52) U.S. Cl.
CPC ........... *B60L 3/0069* (2013.01); *B60L 3/0076* (2013.01); *B60L 7/003* (2013.01); *B60L 11/1803* (2013.01); *B60L 15/2009* (2013.01); *H02P 6/24* (2013.01); *B60L 2240/461* (2013.01); *B60L 2260/20* (2013.01); *B60L 2260/26* (2013.01); *Y02T 10/644* (2013.01); *Y02T 10/645* (2013.01); *Y02T 10/7275* (2013.01)

(56) References Cited

U.S. PATENT DOCUMENTS

2011/0241589 A1\* 10/2011 Danjo .................... B60L 3/003
  318/453
2013/0207581 A1\* 8/2013 Aoki ........................ H02P 3/22
  318/400.21

FOREIGN PATENT DOCUMENTS

| JP | 2011-155708 A | 8/2011 |
| JP | 2013-121256 A | 6/2013 |
| JP | 2015-033292 | 2/2015 |
| WO | 2015/019155 A2 | 2/2015 |

\* cited by examiner

US 9,873,352 B2

VEHICLE CONTROL SYSTEM AND CONTROL METHOD

CROSS-REFERENCE TO RELATED APPLICATIONS

This is a national phase application based on the PCT International Patent Application No. PCT/IB2014/02215 filed Oct. 24, 2014, claiming priority to Japanese Patent Application No. 2013-222575 filed Oct. 25, 2013, the entire contents of both of which are incorporated herein by reference.

BACKGROUND OF THE INVENTION

1. Field of the Invention

The invention relates to vehicle, control system and control method for controlling a vehicle including a three-phase AC motor.

2. Description of Related Art

A method of detecting electric leakage in a three-phase AC motor has been, proposed (see Japanese Patent Application Publication No. 7-241002 (JP 7-241002 A)). According to this method, either the upper arms or the lower arms of an inverter are momentarily placed in the ON state, so as to determine which phase of the three phases suffers from electric leakage.

A system configured to turn on switching devices of phases other than a short-circuited phase, using back electromotive force, when a short circuit is detected has also been proposed (see Japanese Patent Application Publication No. 2013-121256 (JP 2013-121256 A)).

Also, a system that disconnects an arm including a short-circuited phase from a circuit when a short circuit is detected has also been proposed (see Japanese Patent Application Publication No. 2011-155708 (JP 2011-155708 A)). In this publication, it is also disclosed that, when the rotational speed of a motor-generator becomes equal to or higher than a predetermined rotational speed after detection of a short circuit, the three phases of the arms on the short-circuit side are brought into the ON states, so as to lower the current value, thus assuring a thermal advantage.

In the meantime, it is possible to reduce a switching loss of a power converter, by performing particular-phase ON control on the power converter when the vehicle is stopped.

The particular-phase ON control means control for placing all of first switching devices (which are generally called "upper arm" or "lower arm") or second switching devices (which are generally called "lower arm" or "upper arm") in the OFF state, and placing at least one of the other of the first switching devices and the second switching devices in the ON state. Namely, the particular-phase ON control includes one-phase ON control in which one phase of the three phases is placed in the ON state, two-phase ON control in which two phases are placed in the ON states, and three-phase ON control in which the three phases are placed in the ON states.

SUMMARY OF THE INVENTION

When the particular-phase ON control is executed in a situation where short circuit occurs in at least one phase of either the first switching devices or the second switching devices, the first switching device(s) and the second switching device(s) may be short-circuited.

In particular, the particular-phase ON control is supposed to be kept performed during a vehicle stop period (i.e., while the vehicle is stopped), unlike the control for detecting electric leakage as disclosed in JP 7-241002 A. Accordingly, in this case, relative large electric current continuously, flows through the power converter during the vehicle stop period. This phenomenon is not desirable from the viewpoint of part protection or system protection. Namely, conventional systems including those disclosed in the above-identified patent publications suffer from a technical problem that measures to execute the particular-phase ON control while the vehicle is stopped are not sufficiently taken.

The invention provides a vehicle control system and a control method for safely carrying out particular-phase ON control when short circuit is detected in a power converter.

According to one aspect of the invention, a control system for a vehicle is provided. The vehicle includes a three-phase AC motor operable to rotate in synchronization with a drive shaft of the vehicle, a first switching device and a second switching device that are electrically connected in series and provided for each of three phases of the three-phase AC motor, and a power converter configured to control turn-on and turn-off of the first switching device and the second switching device. The control system includes a short-circuit detector configured to detect short circuit in the first switching device and the second switching device, and an ECU. The ECU is configured to: (a) determine that the vehicle is stopped when a rotational speed of the three-phase AC motor is equal to or lower than a first threshold value, and an operation to stop the vehicle is performed, (b) control the power converter, when the ECU determines that the vehicle is stopped, so as to place the power converter in a predetermined condition in which one of the first switching device and the second switching device for all of the three phases is in an OFF state, and the other of the first switching device and the second switching device for at least one of the three phases is in an ON state, and (c) control the power converter when the short-circuit detector detects a short circuit in one of the first switching devices and the second switching devices, so that said one of the first switching devices and the second switching devices in which the short circuit is detected provides the ON state in the predetermined condition.

According to the first aspect of the invention, when it is determined that the vehicle is stopped, the power converter is brought into the predetermined condition under control of the ECU.

The predetermined condition means a condition in which one of the first switching device and the second switching device for all of the three phases is in the OFF state, and the other of the first switching device and the second switching device for at least one of the three phases is in the ON state. Namely, the control for placing the power converter in the predetermined condition is equivalent to the above-described particular-phase ON control. According to the particular-phase ON control, the switching operation of the power converter is stopped during the vehicle stop period, and therefore, power consumption can be saved or reduced.

Furthermore, a short circuit in the power converter is detected by the short-circuit detector. For example, when the power converter is shut down, the short-circuit detector can detect a short circuit in the power converter, based on values and/or waveform of load current of the power converter which is produced by back electromotive force of the three-phase AC motor, or the result of comparison of these values and/or waveform of the load current among the three phases. It is, however, to be understood that the detailed configuration of the short-circuit detector has no influence on the essential technical concept of the invention. Namely, various types of known short-circuit detectors may be employed as the short-circuit detector.

Since the three-phase AC motor rotates in synchronization with the drive shaft, it rotates in accordance with rotation of the drive shaft even in a condition where the power converter is a shut-down state. The above-indicated back electromotive force means back electromotive force that can be produced in this case, for example.

The information about the short circuit detected by the short-circuit detector may not include particular information on its location (short-circuit part), may include particular information that specifies at least whether the short-circuited switching device is the first switching device or the second switching device, or may include both particular information that specifies whether the short-circuited switching device is the first switching device or the second switching device, and particular information that specifies which phase of the three phases the short-circuited switching device is associated with, for example.

When a short circuit is detected in one of the first switching device and the second switching device by the short-circuit detector, the particular-phase ON control is performed so that at least one of the switching devices on the side including the switching device in which the short circuit is detected is placed in the ON state. Namely, all of the switching devices on the side where no short circuit occurs are placed in the OFF states.

Thus, according to the first aspect of the invention, the particular-phase ON control during stop of the vehicle is performed in a condition where electric insulation is ensured in one of the first and second switching devices. Accordingly, even if a short circuit is detected in the power converter, the particular-phase ON control can be safely carried out while the vehicle is stopped, so that a power saving effect can be obtained due to the particular-phase ON control.

According to a second aspect of the invention, a method of controlling a vehicle is provided. The vehicle includes a three-phase AC motor operable to rotate in synchronization with a drive shaft of the vehicle, a first switching device and a second switching device that are electrically connected in series and provided for each of three phases of the three-phase AC motor, a power converter operable to control turn-on and turn-off of the first switching device and the second switching device, a short-circuit detector configured to detect short circuit in the first switching device and the second switching device, and an ECU. The method includes the steps of: determining, by the ECU, that the vehicle is stopped when a rotational speed of the three-phase AC motor is equal to or lower than a first threshold value, and an operation to stop the vehicle is performed, controlling, by the ECU, the power converter when it is determined that the vehicle is stopped, so as to place the power converter in a predetermined condition in which one of the first switching device and the second switching device for all of the three phases is in an OFF state, and the other of the first switching device and the second switching device for at least one of the three phases is in an ON state, and controlling, by the ECU, the power converter when the short-circuit detector detects a short circuit in one of the first switching devices and the second switching devices, so that said one of the first switching devices and the second switching devices in which the short circuit is detected provides the ON state in the predetermined condition.

The operation and other advantages of the invention will be apparent from the following description of embodiments.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

One embodiment of the invention will be described with reference to the drawings.

Figure 1:
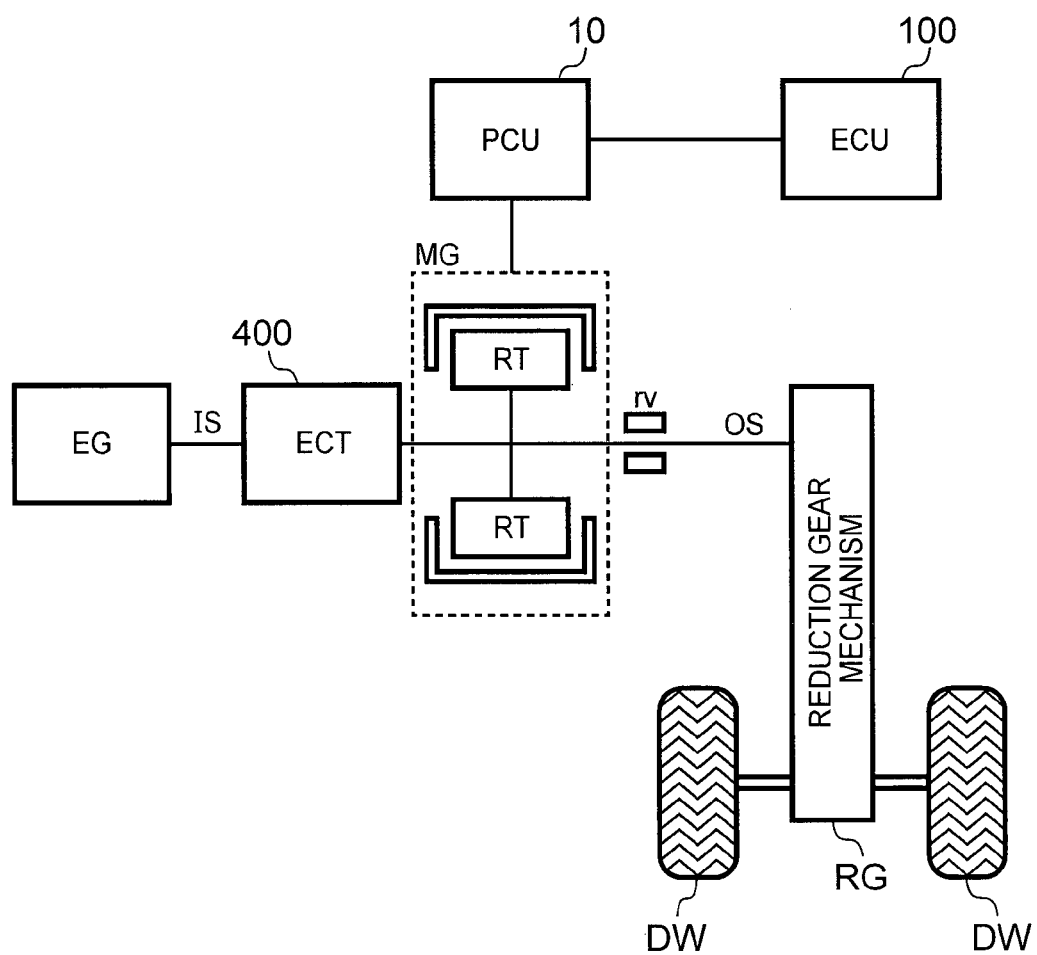
FIG. 1 is a view schematically showing the configuration of a vehicle according to one embodiment of the invention.

Initially, referring to FIG. 1, a vehicle 1 according to one embodiment of the invention will be described. FIG. 1 schematically illustrates the configuration of the vehicle 1.

In FIG. 1, the hybrid vehicle 1 is one example of "vehicle" according to the invention, which includes a PCU (Power Control Unit) 10, engine EG, ECT (Electronically Controlled Transmission) 400, motor-generator MG, and a reduction gear mechanism RG.

While the hybrid vehicle of so-called one motor type is illustrated in this embodiment, the vehicle according to the invention may be a hybrid vehicle of two-motor type including two motor-generators, or a hybrid vehicle including a larger number of motor-generators.

The PCU 10 is a power control unit for controlling the drive status of the motor-generator MG. The configuration of the PCU 10 will be described in detail with reference to FIG. 2.

The engine EG is an internal combustion engine, such as a multi-cylinder gasoline engine, which functions as one source of driving force of the hybrid vehicle 1. While the multi-cylinder gasoline engine is used as the engine EG in this embodiment, the engine EG may have any configuration, in terms of the number of cylinders, the arrangement of the cylinders, the type of fuel, etc.

The ECT 400 is a known transmission having two or more gear positions. The ECT 400 has two or more gear positions to be established between an input shaft IS coupled to a crankshaft of the engine EG, and an output shaft OS coupled to the reduction gear mechanism RG, and is configured to be shifted as needed to a selected one of the gear positions, under control of a controller (not shown). The ratio of the rotational speed of the input shaft IS to that of the output shaft OS, namely, the speed ratio, is different among the two or more gear positions. It is, however, to be understood that any type of transmission may be provided between the engine EG and the reduction gear mechanism RG Since the performance of the vehicle control system according to the invention is not largely influenced by the type of the transmission provided in the vehicle, detailed description of the transmission will not be provided.

The motor-generator MG is a three-phase AC motor-generator as one example of "three-phase AC motor" according to the invention. The motor-generator MG has a power running function of converting electric energy to kinetic energy, and a regenerative function of converting kinetic energy to electric energy.

An output rotary shaft of the motor-generator MG is coupled to the output shaft OS as described above, and the output rotational speed Nout as the rotational speed of the output shaft OS is equal to the MG rotational speed Nmg as the rotational speed of the motor-generator MG A reduction gear or a transmission may be interposed as needed between the motor-generator MG and the output shaft OS.

A resolver rv for detecting the rotation angle of the motor-generator MG is mounted on the output rotary shaft of the motor-generator MG. The rotation angle of the motor-generator MG detected by the resolver rv is used for calculation of the MG rotational speed Nmg.

The reduction gear mechanism RG is a gear unit including a reduction gear selected from various types of reduction gears, differential, and so forth.

Figure 2:
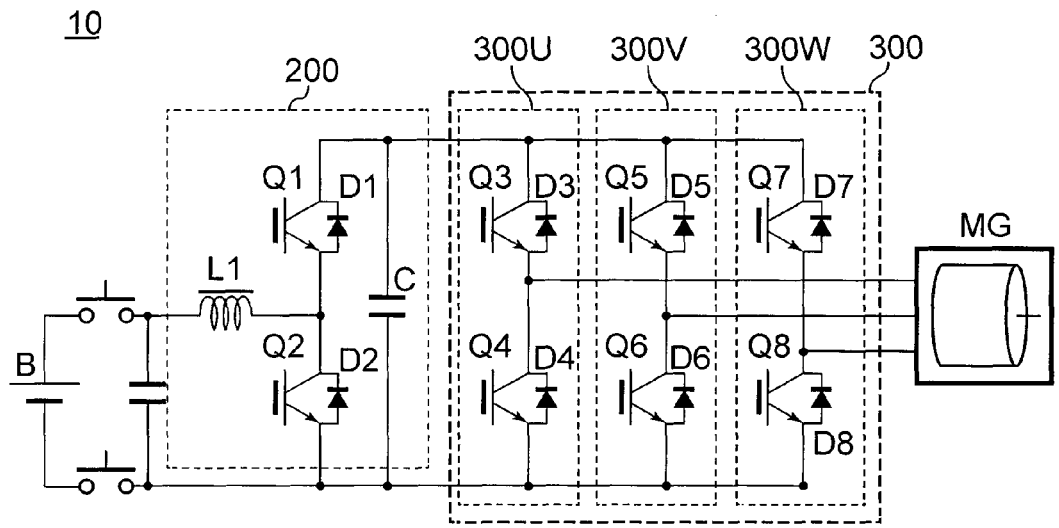
FIG. 2 is a schematic circuit diagram of a PCU in the vehicle of FIG. 1.

Referring next to FIG. 2, the configuration of the PCU 10 will be described. FIG. 2 is a schematic circuit diagram of the PCU 10. In FIG. 2, the same reference numerals or symbols are assigned to components or parts that are also included in FIG. 1, and explanation of these components or parts will be omitted as appropriate.

In FIG. 2, the PCU 10 is a power control unit that includes a boost converter 200 and an inverter 300, and is configured to be able to control input and output of electric power between a DC power supply B and the motor-generator MG.

The DC power supply B is a secondary battery unit of a power supply voltage VB (e.g., 200V), in which a plurality of (e.g., several hundreds of) secondary cells (each having several volts), such as nickel-metal-hydride cells or lithium-ion cells, are connected in series; for example. As the DC power supply B, an electric double layer capacitor, large-capacity capacitor, flywheel, or the like, may be used in place of or in addition to this type of secondary battery.

The boost converter 200 is a step-up circuit including a reactor L1, switching devices Q1 and Q2, diodes D1 and D2, and a capacitor C.

In the boost converter 200, one end of the reactor L1 is connected to a positive line (to which no reference numeral is assigned) connected to the positive terminal of the DC power supply B, and the other end of the reactor L1 is connected to an intermediate point between the switching device Q1 and the switching device Q2, namely, a connection point between an emitter terminal of the switching device Q1 and a collector terminal of the switching device Q2.

The switching devices Q1 and Q2 are electric switching devices connected in series between the above-mentioned positive line, and a negative line (to which no reference numeral is assigned) connected to the negative terminal of the DC power supply B. A collector terminal of the switching device Q1 is connected to the positive line, and an emitter terminal of the switching device Q2 is connected to the negative line. The diodes D1 and D2 are rectifying devices that only permit flow of current from the emitter side to the collector side, in the respective switching devices Q1, Q2.

In this embodiment, the switching device Q1 on the higher potential side of the connection point with the end portion of the reactor L1, and the switching device Q2 on the lower potential side of the connection point, constitute a double-arm-type boost converter. The above arrangement of the switching devices is a mere example, and the boost converter may be a single-arm-type boost converter including only the switching device Q2 of FIG. 2.

Each of the switching devices Q1 and Q2, and the switching devices (Q3 through Q8) of the inverter 300 as described later is in the form of an IGBT (Insulated Gate Bipolar Transistor) equipped with a self-protection circuit. However, these switching devices may be power MOS (Metal Oxide Semiconductor) transistors, or the like.

The capacitor C is connected between the positive line and the negative line. The voltage between the terminals of the capacitor C, namely, a potential difference VH between the positive line and the negative line, is the output voltage of the boost converter 200.

The inverter 300 is one example of "power converter" according to the invention, which includes a U-phase arm 300U including a positive-side switching device Q3 and a negative-side switching device Q4, a V-phase arm 300V including a positive-side switching device Q5 and a negative-side switching device Q6, and a W-phase arm 300W including a positive-side switching device Q7 and a negative-side switching device Q8.

The respective arms of the inverter 300 are connected in parallel between the positive line and the negative line. The positive-side switching device in each arm is one example of "first switching device" according to the invention, and the negative-side switching device in each arm is one example of "second switching device" according to the invention. For the purpose of illustration, the positive-side switching device will be referred to as "upper arm" when appropriate, and the negative-side switching device will be referred to as "lower arm" when appropriate.

Similarly to the switching devices Q1 and Q2 of, the boost converter 200 as described above, rectifier diodes D3 through D8 that permit current to flow from the emitter side to the collector side are connected to the switching devices Q3 through Q8, respectively. A connection point between the upper arm and the lower arm of each phase in the inverter 30 is connected to each phase coil of the motor-generator MG.

Figure 3:
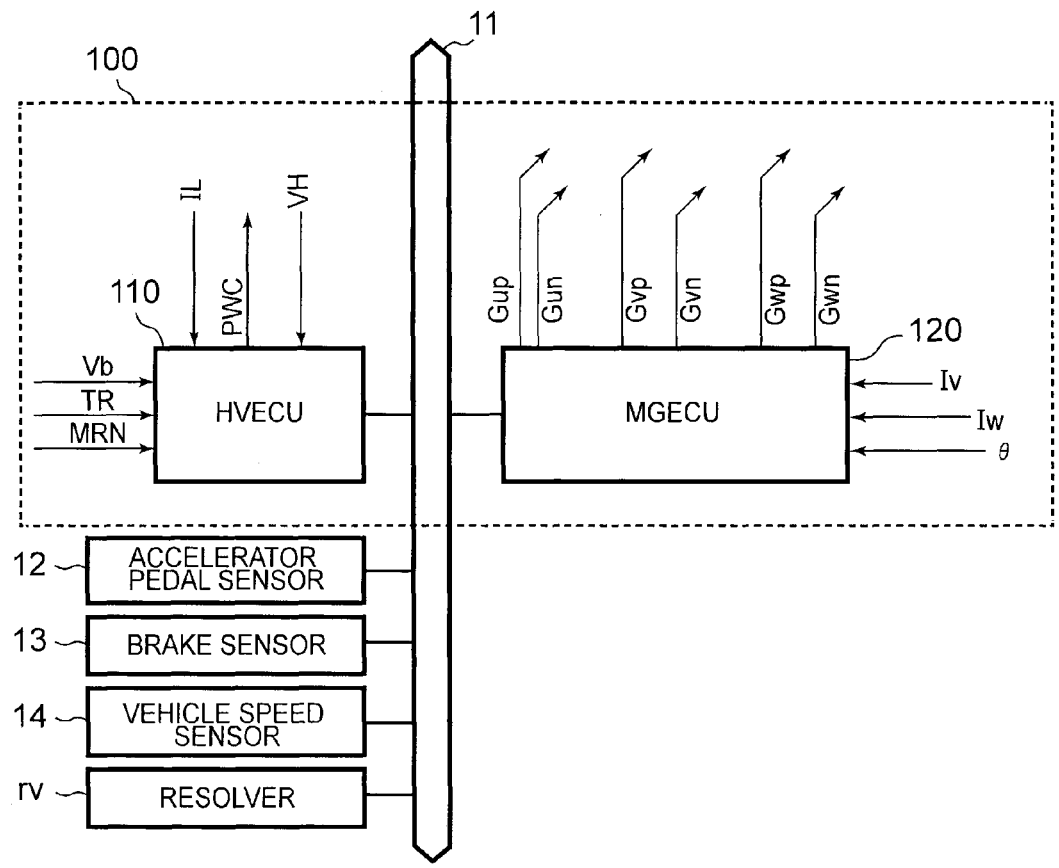
FIG. 3 is a view schematically showing the configuration of a controller that controls the vehicle of FIG. 1.

In the hybrid vehicle 1, the PCU 10 is controlled by a controller 100. Referring to FIG. 3, the configuration of the controller 100 will be described. FIG. 3 is a block diagram of the controller 100.

In FIG. 3, the controller 100 is a computer configured to be able to control the operation of the hybrid vehicle 1. The controller 100 consists of two or more ECUs (Electronic Control Units) including an HVECU 110 and an MGECU 120. The ECUs that constitute the controller 100 are electrically connected via a control bus 11.

The controller 100 includes storage devices, such as a ROM (Read Only Memory) and a RAM (Random Access Memory), for storing information needed for operation of the controller 100. For example, the ROM stores control programs concerning various controls executed by the respective ECUs. Also, the RAM stores various kinds of information to be temporarily stored in the process of execution of the above-mentioned various controls.

Figure 4:
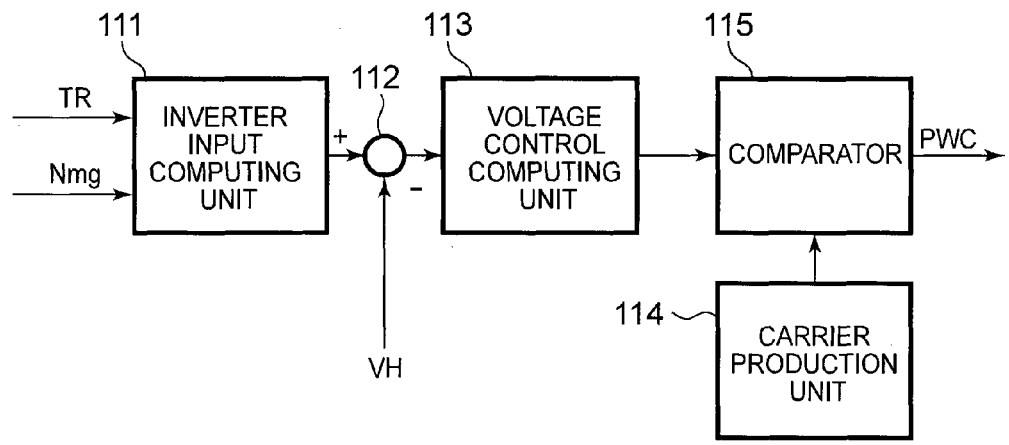
FIG. 4 is a block diagram of an HVECU in the controller of FIG. 3.

The HVECU 110 is an ECU that comprehensively controls the operation of the PCU 10. Referring to FIG. 4, the configuration of the HVECU 110 will be described. FIG. 4 is a block diagram of the HVECU 110.

In FIG. 4, the HVECU 110 includes an inverter input computing unit 111, adder/subtractor 112, voltage control computing unit 113, carrier production unit 114, and a comparator 115.

The inverter input computing unit 111 is a circuit that produces a VH command value VHtg as a target value of the output voltage VH of the boost converter 200. The inverter input computing unit 111 produces the VH command value VHtg, based on the MG rotational speed Nmg, and an output value of the motor-generator MG which is calculated from a torque command value TR for the motor-generator MC; so that a loss that arises when the motor-generator MG is driven is minimized. The VH command value VHtg is experimentally, empirically or theoretically adapted, and stored as an adapted value in the ROM. The torque command value TR of the motor-generator MG is determined by any of various known methods, based on operating conditions, etc. of the hybrid vehicle 1.

The adder/subtractor 112 is a computing unit that subtracts a detection value of the output voltage VH of the boost converter 200 from the VH command value VHtg, and outputs the result of subtraction to the voltage control computing unit 113.

When the voltage control computing unit 113 receives the result of subtraction obtained by subtracting the detection value of the output voltage VH from the VH command value VHtg, from the adder/subtractor 112, it computes a controlled variable that makes the output voltage VH of the boost converter 200 equal to the VH command value VHtg. At this time, known PI control computation, or the like, including a proportional term (P term) and an integral term (I term) is used, for example. The voltage control computing unit 113 outputs the controlled variable thus calculated, as a voltage command value, to the comparator 115.

On the other hand, the carrier production unit 114 produces a carrier signal in the form of triangular wave, and sends the carrier signal to the comparator 115. The comparator 115 compares the voltage command value supplied from the voltage control computing unit 113, with the carrier signal, and produces a signal PWC whose logical state changes according to the relationship in magnitude between the voltage values. The signal PWC thus produced is transmitted to the switching devices Q1 and Q2 of the boost converter 200.

The boost converter 200 is controlled under boosting control executed by the HVECU 110. Under the boosting control, the voltage between the positive line and the negative voltage, namely, the output voltage VH, can be raised to be equal to or greater than the power supply voltage VB of the DC power supply B, based on the above-described signal PWC. At this time, if the output voltage VH is lower than the VH command value VHtg as the target value, the on-duty of the switching device Q2 is relatively increased, so that current flowing from the DC power supply B side to the inverter 300 side through the positive line can be increased, and the output voltage VH can be raised. On the other hand, if the output voltage VH is higher than the VH command value VHtg, the on-duty of the switching device Q1 is relatively increased, so that current flowing from the inverter 300 side to the DC power supply B side through the positive line can be increased, and the output voltage VH can be reduced.

The HVECU 110 is configured as described above. While the configuration as illustrated in FIG. 4 is a circuit configuration that realizes voltage control, the control form of the boost converter 200 is not limited to the voltage control as described above, but may be current control.

Figure 5:
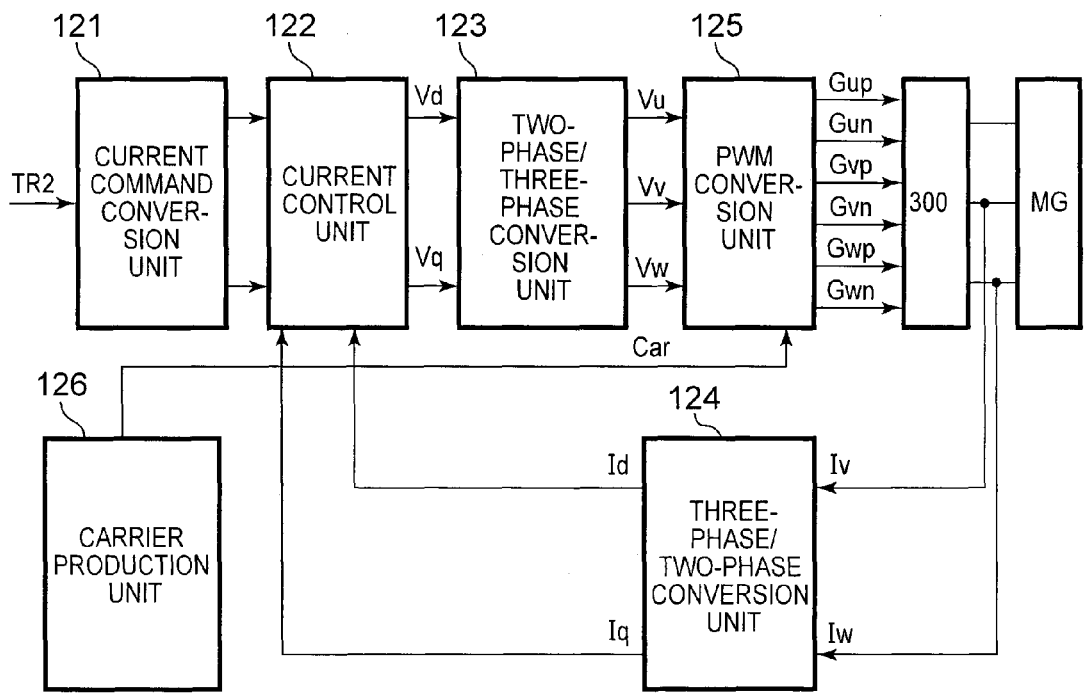
FIG. 5 is a block diagram of an MGECU in the controller of FIG. 3.

Referring back to FIG. 3, the MGECU 120 is an ECU that controls the drive status of the motor-generator MG via the inverter 300. Referring to FIG. 5, the configuration of the MGECU 120 will be described. FIG. 5 is a block diagram of the MGECU 120.

In FIG. 5, the MGECU 120 principally consists of a current command conversion unit 121, current control unit 122, two-phase/three-phase conversion unit 123, three-phase/two-phase conversion unit 124, PWM conversion unit 125, and a carrier production unit 126

The current command conversion unit 121 produces a two-phase current command value (Idtg, Iqtg), based on the torque command value TR of the motor-generator MG.

On the other hand, v-phase current Iv and w-phase current Iw are supplied as feedback information from the inverter 300 to the three-phase/two-phase conversion unit 124. In the three-phase/two-phase conversion unit 124, three-phase current values including the v-phase current Iv and the w-phase current Iw are converted to two-phase current values consisting of a d-axis current Id and a q-axis current Iq. The two-phase current values obtained by conversion are transmitted to the current control unit 122.

The current control unit 122 produces two-phase voltage command values consisting of a d-axis voltage Vd and a q-axis voltage Vq, based on differences between the two-phase current command values produced in the current command conversion unit 121, and the two-phase current values Id and Iq received from the three-phase/two-phase conversion unit 124. The two-phase voltage command values Vd and Vq thus produced are transmitted to the two-phase/three-phase conversion unit 123.

The two-phase/three-phase conversion unit 123 converts two-phase voltage command values Vd and Vq to three-phase voltage command values Vu, Vv and Vw. The three-phase voltage command values Vu, Vv and Vw obtained by conversion are transmitted to the PWM conversion unit 125.

The PWM conversion unit 125 receives a carrier Car produced by the carrier production unit 126 and having a given carrier frequency fcar, from the carrier production unit 126, and compares the carrier Car with the three-phase voltage command values Vu, Vv and Vw obtained by conversion. Further, the PWM conversion unit 125 produces U-phase switching signals Gup and Gun, V-phase switching signals Gyp and Gvn, and W-phase switching signals Gwp and Gwn, whose logical states change depending on the results of comparison, and supplies these signals to the inverter 300.

More specifically, signals to which an identifier "p" is attached, out of the switching signals corresponding to the respective phases (300U, 300V and 300W), mean drive signals for driving the switching devices of the respective phases in the upper arms (Q3, Q5 and Q7), and signals to which an identifier "n" is attached mean drive signals for driving the switching devices of the respective phases in the lower arms (Q4, Q6 and Q8).

In particular, if the voltage command value of each phase becomes equal to the carrier Car from a value smaller than the carrier Car when the carrier Car and the voltage command value of each phase are compared with each other, a switching signal for turning on the corresponding upper arm (positive-side switching device) is produced. Also, if the voltage command value of each phase becomes equal to the carrier Car from a value larger than the carrier Car, a switching signal for turning on the corresponding lower arm (negative-side switching device) is produced. Namely, the switching signals in a normal control mode are those for turning on and turning off the switching devices of the same phase at the same time, and the switching device of each phase in one of the upper arm and the lower arm is in the ON state while the switching device of the same phase in the other arm is in the OFF state.

When each switching device of the inverter 300 is changed into or kept in a drive status specified by the switching signal of each phase, the motor-generator MG is driven, according to a circuit condition corresponding to the drive status of the switching device. The manner of controlling the inverter 300 as described above is one form of so-called PWM control.

Generally, known overmodulation control and rectangular wave control are often used, other than the above-described PWM control, for control of the motor-generator for driving the vehicle. In the hybrid vehicle 1 according to this embodiment, too, the manner of controlling the inverter 300 may be changed as appropriate according to running conditions of the vehicle.

Referring back to FIG. 3, the controller 100 receives sensor outputs, from various sensors included in the hybrid vehicle 1, via the control bus 11. For example, the controller 100 receives the accelerator pedal position Ta from an accelerator pedal sensor 12, the brake pedal operation amount Tb from a brake sensor 13, and the vehicle speed V from a vehicle speed sensor 14. Also, the controller 100 receives the rotation angle of the motor-generator MG from the above-mentioned resolver rv, and converts it to the MG rotational speed Nmg, through computation performed within the HVECU 110. The brake sensor 13 corresponds to the brake pedal operation amount detector.

Although not illustrated in the drawings, the hybrid vehicle 1 is equipped with sensors for detecting the power supply voltage VB of the DC power supply B, reactor current Ir that, flows through the reactor L1 of the boost converter 200, output voltage VH of the boost converter 200, and each-phase currents (v-phase current, w-phase current Iw, and u-phase current Iu) of the inverter 300. The controller 100 receives these sensor outputs via the control bus 11. To generally express current of each phase of the inverter 300, such a term as "load current IL" will be used when appropriate.

Figure 6:
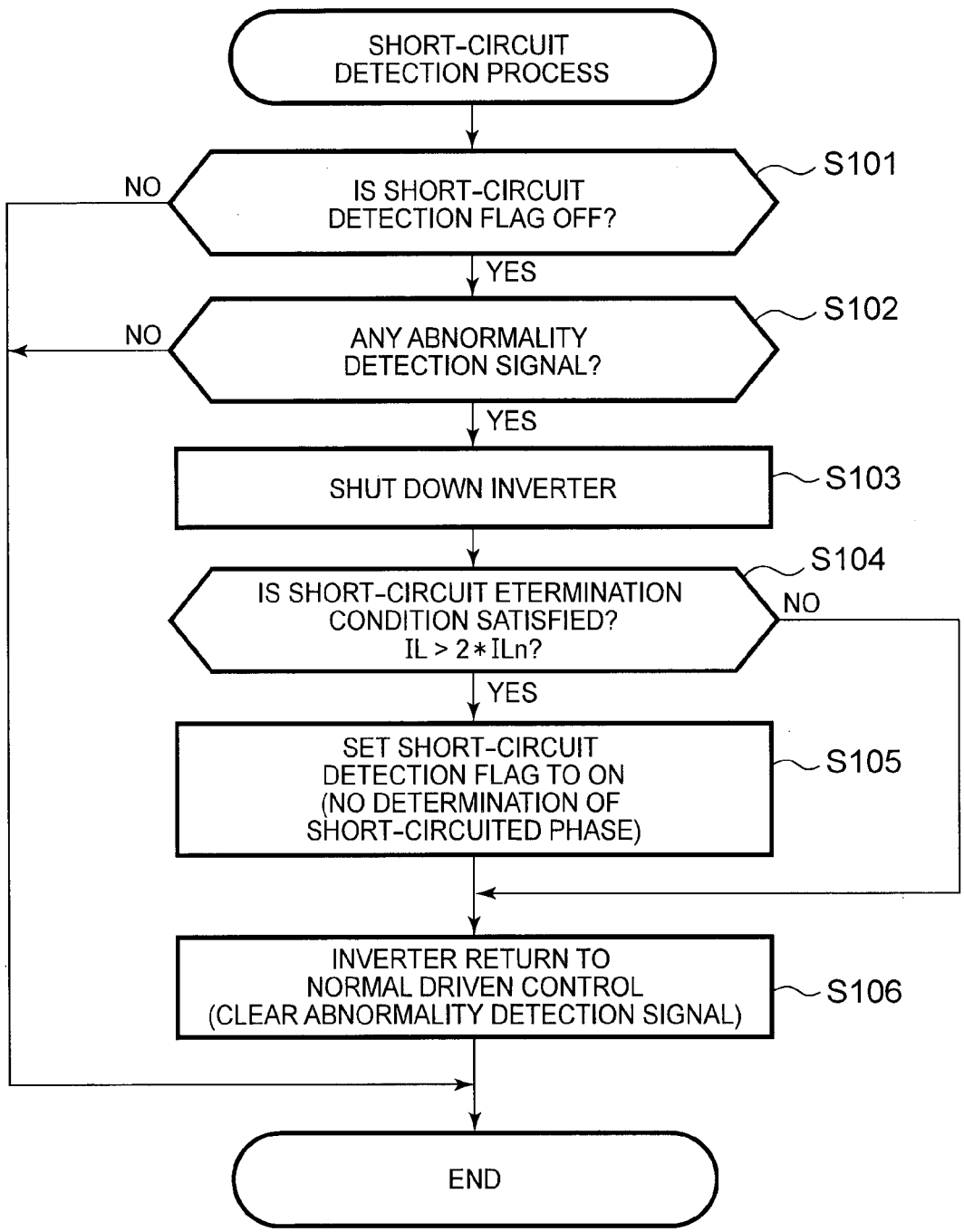
FIG. 6 is a flowchart of a short-circuit detection process.

Next, the operation of this embodiment will be described. Initially, referring to FIG. 6, a short-circuit detection process performed by the HVECU 110 will be described in detail. FIG. 6 is a flowchart of the short-circuit detection process.

In FIG. 6, it is initially determined whether a short-circuit detection flag is OFF (step S101). The short-circuit detection flag is a control flag that is set to ON when it is determined that short circuit occurs in the inverter 300. This flag is OFF in the initial state. When the short-circuit detection flag is ON (step S101: YES), namely, when it is determined that short-circuit occurs in the inverter 300, the short-circuit detection process ends. The short-circuit detection process is repeatedly executed at given intervals.

When the short-circuit detection flag is OFF (step S101: YES), it is determined whether there is an abnormality detection signal (step S102). The abnormality detection signal is an output signal of a known self-protection circuit provided in each of the switching devices Q3 through Q8 of the inverter 300. The self-protection circuit is installed in view of the low-current durability of the IGBT, and is configured to output an abnormality detection signal when overcurrent arises in the switching device. When there is no abnormality detection signal (step S102: NO), the short-circuit detection process ends.

When there is an abnormality detection signal (step S102: YES), the HVECU 100 shuts down the inverter 300 (step S103). To shut down means stopping driving of the switching devices (namely, turning off all of the switching devices).

After the inverter 300 is shut down, it is determined whether a phase short-circuit determination condition is satisfied (step S104). The phase short-circuit determination condition according to this embodiment is that the load current IL of the inverter 300 is greater than twice a detection error current value ILn of the current sensor included in each phase of the inverter 300. It is, however, to be understood that this phase short-circuit determination condition is a mere example, and various changes in terms of design may be made without departing from the principle of this invention.

During running of the hybrid vehicle 1, even if the inverter 300 is shut down, the motor-generator MG linked to the drive wheels via the output shaft OS is rotated. As a result, back electromotive force arises from rotation of the motor-generator MG.

When no short circuit occurs to the inverter 300, no current flows through the inverter 300 that is in a shut-down condition even in the presence of this type of back electromotive force. On the other hand, if a short-circuit part is present in the inverter 300, a current circulation path including the short-circuit part is formed, and current flows in the inverter 300. A current value representing this current is larger than a detection error of the current sensor.

Accordingly, if a load current that is equal to or greater than a reference value (twice the detection error current value ILn) including a margin for improving the detection accuracy is detected, it can be determined with high accuracy that there is a short-circuit part in the inverter 300.

If the short-circuit determination condition is not satisfied (step S104: NO), the control proceeds to step S106, and the inverter 300 returns to normal drive control. Once the inverter 300 returns to normal drive control, the short-circuit detection process ends.

If, on the other hand, the short-circuit determination condition is satisfied (step S104: YES), the short-circuit detection flag is set to ON (step S105). Once the short-circuit detection flag is set to ON, the inverter 300 is returned to normal drive control (step S106), and the short-circuit detection process ends.

Figure 7:
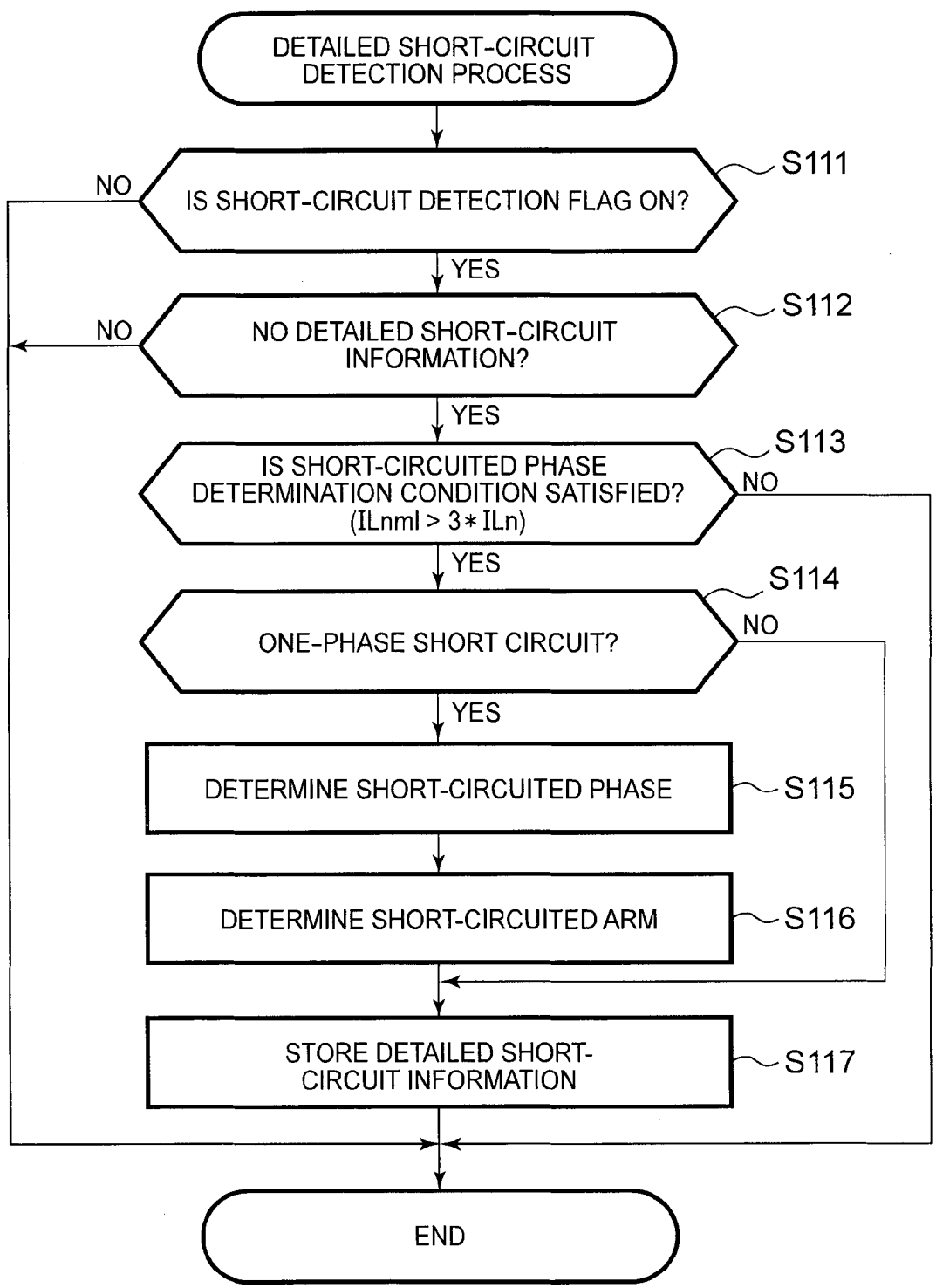
FIG. 7 is a flowchart of a detailed short-circuit detection process.

Next, referring to FIG. 7, a detailed short-circuit detection process will be described. FIG. 7 is a flowchart of the detailed short-circuit detection process. The detailed short-circuit detection process is a process for detecting a more detailed short-circuit condition of the inverter 300.

In FIG. 7, it is determined whether the above-described short-circuit detection flag is ON (step S111). If the short-circuit detection flag is OFF (step S111: NO), the detailed short-circuit detection process ends. The detailed short-circuit detection process is repeatedly executed at given intervals.

If the short-circuit detection flag is ON (step S111: YES), the presence or absence of detailed short-circuit information is checked, and it is determined whether there is no detailed short-circuit information (step S112). The detailed short-circuit information is detailed information concerning short circuit of the inverter 300, and may include, as needed, information as to whether short circuit of the inverter 300 corresponds to one-phase short circuit where only one phase is short-circuited, Or corresponds to multi-phase short circuit Where two or more phases are short-circuited, information that specifies a short-circuited arm, information that specifies a short-circuited phase, and so forth. When such detailed short-circuit information is already present (step S112: NO), the detailed short-circuit detection process ends.

When there is no detailed short-circuit information (step S112: YES), it is determined whether a short-circuited phase determination condition is satisfied (step S113). The short-circuited phase determination condition in this embodiment is that the current value of a non-shorted phase is equal to or greater than a reference value set to be three times the detection error current value ILn of the current sensor. The reference value is experimentally, empirically or theoretically set so as to ensure a given level of or higher accuracy with which a short-circuited phase is specified, and various changes in terms of design may be made.

If the short-circuited phase determination condition is not satisfied (step S113: NO), it is found difficult to specify the short-circuited phase with high accuracy, and the detailed short-circuit detection process ends. If, on the other hand, the short-circuited phase determination condition is satisfied (step S113: YES), it is determined whether the short circuit of the inverter 300 is one-phase short circuit (step S114).

Referring to FIG. 8 through FIG. 11, the principle based on which it is determined whether the short circuit of the inverter 300 is one-phase short circuit or multi-phase short circuit will be described.

FIG. 8A through FIG. 8C and FIG. 9A through FIG. 9C are views explaining the principle of detection of one-phase short circuit.

Figure 8A:
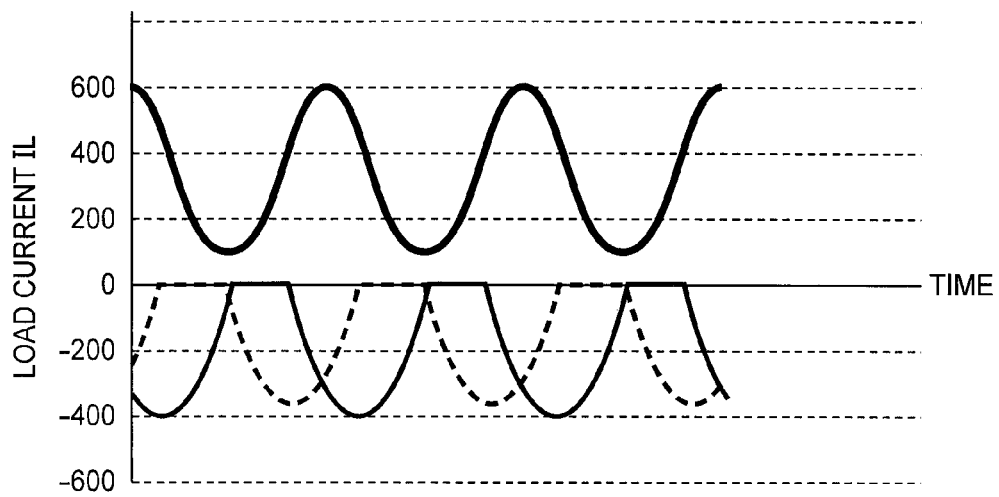
FIG. 8A is a view showing time characteristics of load currents flowing in an inverter when short circuit occurs in one phase.

In FIG. 8A, time characteristics of load current IL that flows in the inverter 300 at the time of one-phase short circuit are illustrated. Upon occurrence of one-phase short circuit, larger current flows in the short-circuited phase (see the thick solid line in FIG. 8A), as compared with current flowing in the non-shorted phases (see the thin solid line and broken line in FIG. 8A).

Figure 8B:
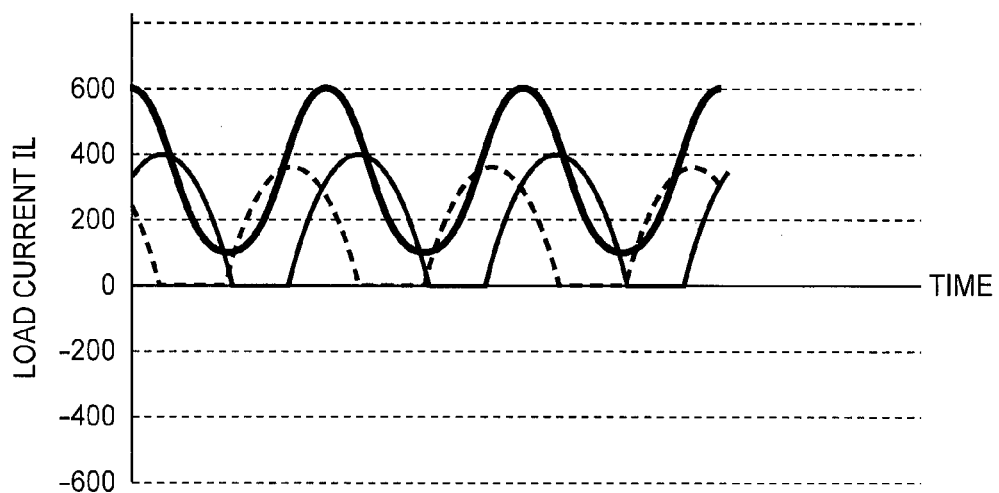
FIG. 8B is a view showing load-current waveforms obtained by performing an absolute value operation on the load currents of FIG. 8A.

If an operation to obtain an absolute value (which will be called "absolute value operation") is performed on each of the load current values (current value of each phase), the respective load currents take waveforms as indicated in FIG. 8B.

Figure 8C:
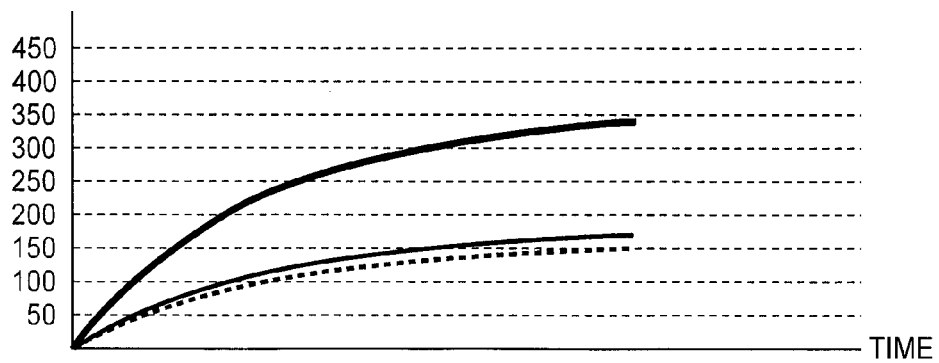
FIG. 8C is a view showing load-current waveforms obtained by performing a smoothing operation on the load currents of FIG. 8B.

If the load current values subjected to the absolute value operation are further subjected to a smoothing operation (operation to convert the current values into effective values), the respective load currents take waveforms as indicated in FIG. 8C. Namely, the current value of the short-circuited phase becomes larger than the current values of the other non-shorted phases.

Figure 9A:
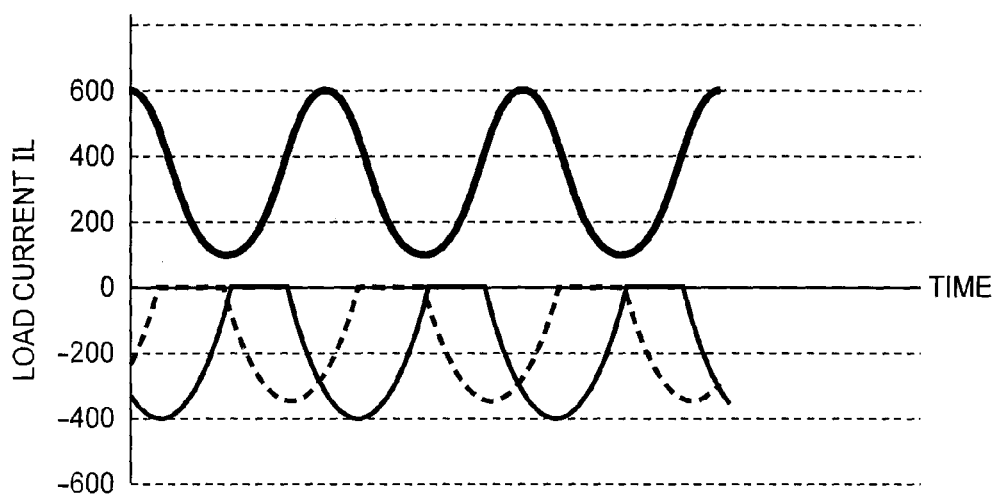
FIG. 9A is a view showing time characteristics of load currents flowing in an inverter when short circuit occurs in one phase.
Figure 9B:
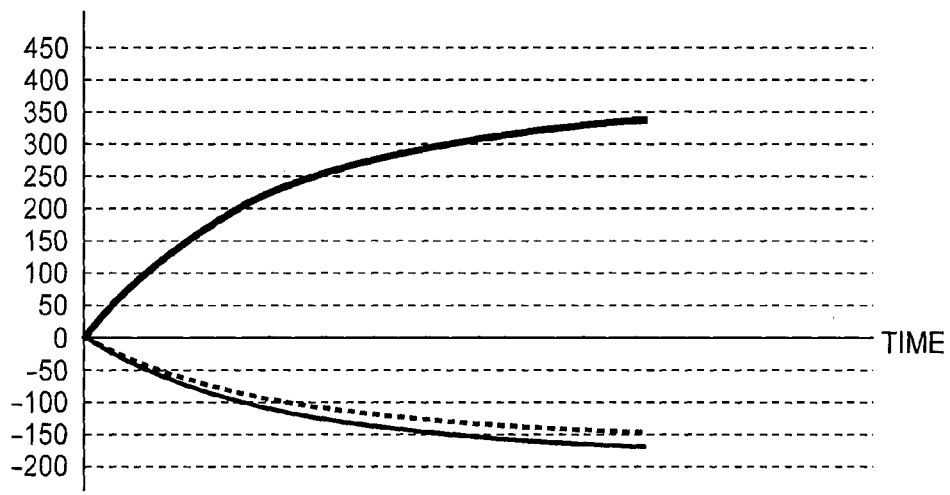
FIG. 9B is a view showing load-current waveforms obtained by performing the smoothing operation on the load currents of FIG. 9A.
Figure 9C:
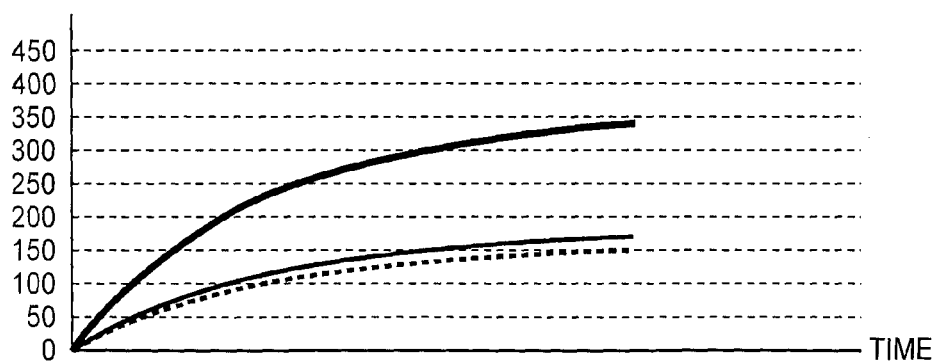
FIG. 9C is a view showing load-current waveforms obtained by performing the absolute value operation on the load currents of FIG. 9B.

In FIG. 9A through FIG. 9C, on the other hand, the case whether the order of execution of the absolute value operation and the smoothing operation is reversed with respect to the case of FIG. 8A through FIG. 8C is shown. Namely, the smoothing operation is performed prior to the absolute value operation (see FIG. 9B), and the absolute value operation is then performed (FIG. 9C).

As is apparent from comparison between FIG. 8A-FIG. 8C and FIG. 9A-FIG. 9C, in the case of one-phase short circuit, the relationships among the finally obtained load currents do not change even if the order of execution of the absolute value operation and the smoothing operation is reversed. Namely, FIG. 8C and FIG. 9C are identical with each other.

Accordingly, it can be determined whether the short circuit that occurs in the inverter 300 is one-phase short circuit, by obtaining current values corresponding to those of FIG. 8C and current values corresponding to those of FIG. 9C for the respective phases and comparing the current values of FIG. 8C with the current values of FIG. 9C.

In the meantime, FIG. 10A through FIG. 10C and FIG. 11A through FIG. 11C are views explaining the principle of detecting multi-phase short circuit.

Figure 10A:
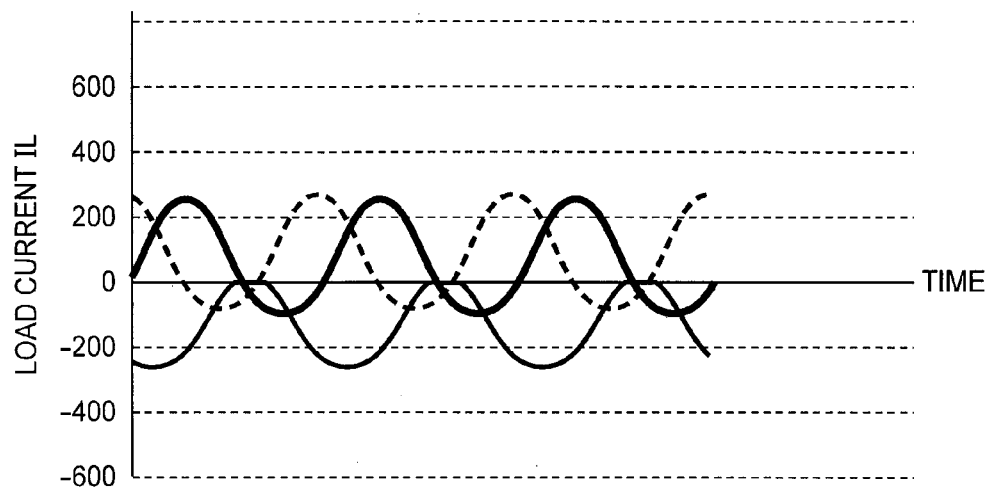
FIG. 10A is a view showing time characteristics of load currents flowing in an inverter when short circuit occurs in two or more phases.

In FIG. 10A, time characteristics of load currents IL flowing in the inverter 300 at the time of multi-phase short circuit are illustrated. Upon occurrence of multi-phase short circuit, values of current flowing in short-circuited phases are reduced as compared with that obtained at the time of one-phase short circuit (see the thick solid line and broken line in FIG. 10A).

Figure 10B:
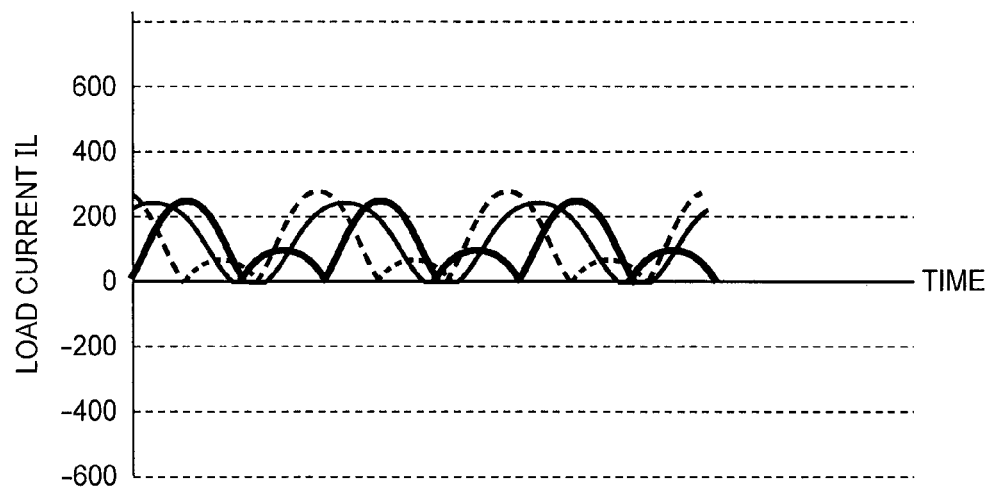
FIG. 10B is a view showing load-current waveforms obtained by performing the absolute value operation on the load currents of FIG. 10A.
Figure 10C:
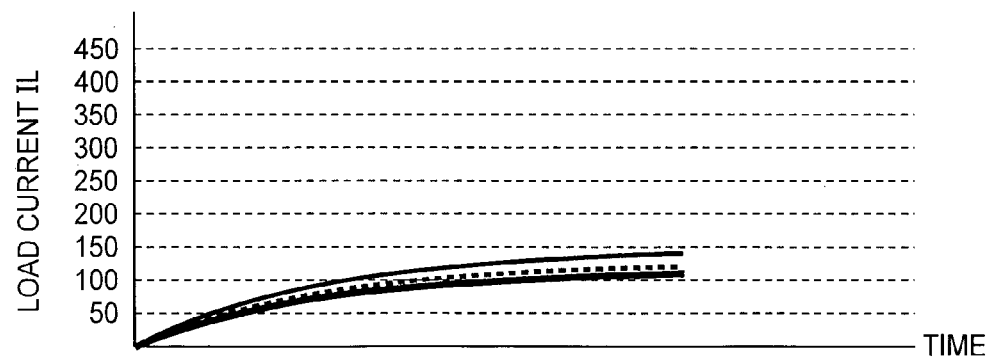
FIG. 10C is a view showing load-current waveforms obtained by performing the smoothing operation on the load currents of FIG. 10B.

If each of the load current values (current value of each phase) is subjected to the absolute value operation similar to that of FIG. 8B, and then subjected to the smoothing operation, the respective load currents take waveforms as indicated in FIG. 10C. Namely, in the case of multi-phase short circuit, the load current values of the respective phases are not largely different from one another if each load current value is subjected to the absolute value operation, and then to the smoothing operation.

Figure 11A:
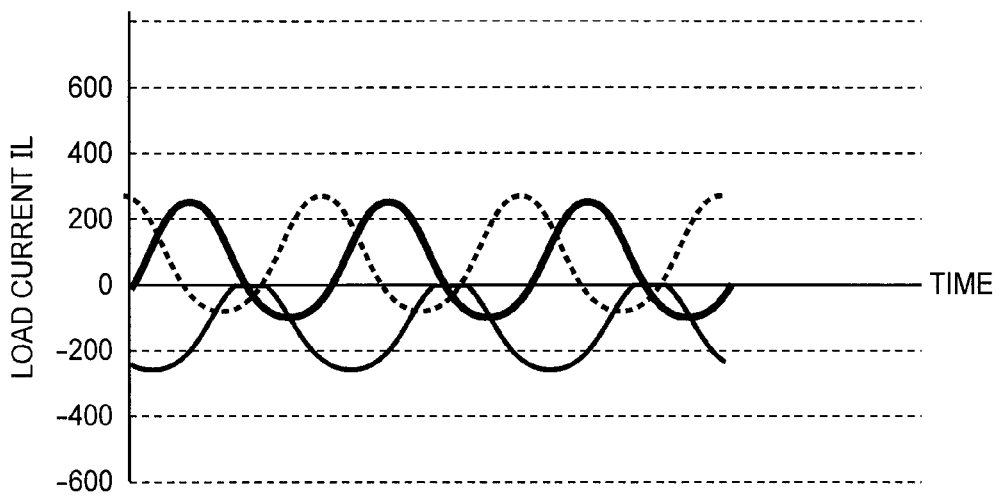
FIG. 11A is a view showing time characteristics of load currents flowing in an inverter when short circuit occurs in two or more phases.
Figure 11B:
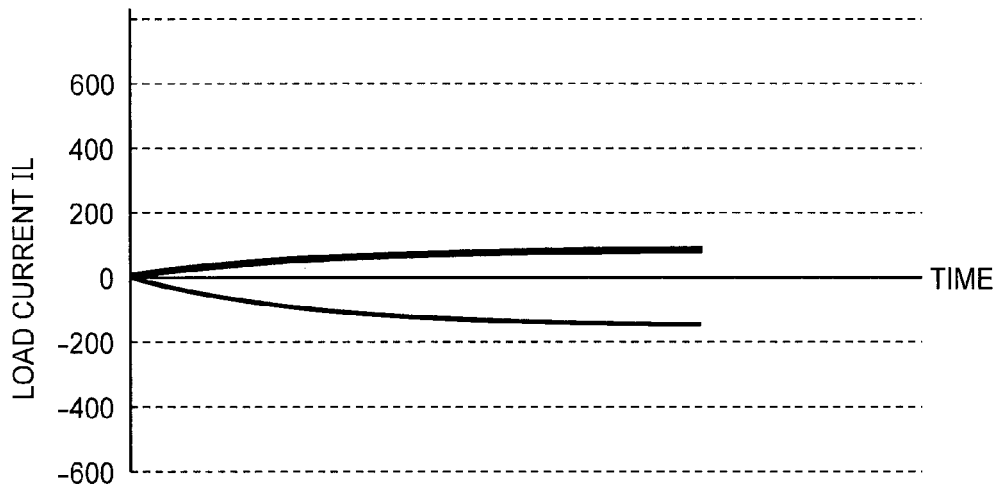
FIG. 11B is a view showing load-current waveforms obtained by performing the smoothing operation on the load currents of FIG. 11A.
Figure 11C:
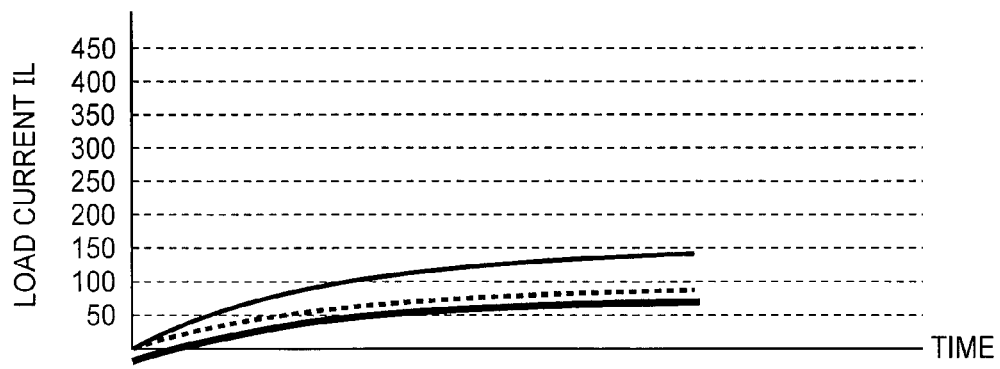
FIG. 11C is a view showing load-current waveforms obtained by performing the absolute value operation on the load currents of FIG. 11B.

On the other hand, the case where the order of execution of the absolute value operation and the smoothing operation is reversed, with respect to the case of FIG. 10A-FIG. 10C, is shown in FIG. 11A-FIG. 11C. Namely, the smoothing operation is performed prior to the absolute value operation (see FIG. 11B), and then the absolute value operation is performed (see FIG. 11C).

As is apparent from comparison between FIG. 10A-FIG. 10C and FIG. 11A FIG. 11C, in the case of multi-phase short circuit, the relationships among the finally obtained load currents change if the order of execution of the absolute value operation and the smoothing operation is reversed. Namely, FIG. 10C is not identical with FIG. 11C.

Accordingly, it can be determined whether the short circuit that occurs in the inverter 300 is multi-phase short circuit, by obtaining current values corresponding to those of FIG. 10C and current values corresponding to those of FIG. 11C for the respective phases, and comparing the current values with each other Referring back to FIG. 7, when the short circuit of the inverter 300 is one-phase short circuit (step S114: YES), the short-circuited phase is then determined (step S115), and the short-circuited arm is further determined (step S116).

In the case of one-phase short circuit, the value of current flowing in the short-circuited phase is twice the current value of the non-shorted phases. Accordingly, the phase having the largest current value after the smoothing operation as indicated in FIG. 8C is determined as the short-circuited phase. Once the short-circuited phase is determined, it can be determined whether the upper arm is short-circuited or the lower arm is short-circuited, depending on the direction (positive of negative) of the current flowing in the short-circuited phase. More specifically, if the sign of the current value after the smoothing operation as indicated in FIG. 9B is positive, it is determined that the upper arm is short-circuited. If the sign of the current value is negative, it is determined that the lower arm is short-circuited.

Once the determination of the short-circuited arm is completed, the information about the short-circuited phase and the short-circuited arm is stored as detailed short-circuit information (step S117). Also, if the short circuit that occurs in the inverter 300 is multi-phase short circuit (step S114: NO), the occurrence of multi-phase short circuit is stored as detailed short-circuit information (step S117). Once the detailed short-circuit information is stored, the detailed short-circuit detection process ends. While it is determined that the short circuit that occurs in the inverter 300 is multi-phase short circuit, based on the negative decision (NO) made in step S114, the multi-phase short circuit itself may be determined from the load current values of the inverter 300 as described above. Accordingly, a step of determining whether it is multi-phase short circuit may be further executed, after the negative decision (NO) is made in step S114.

Figure 12:
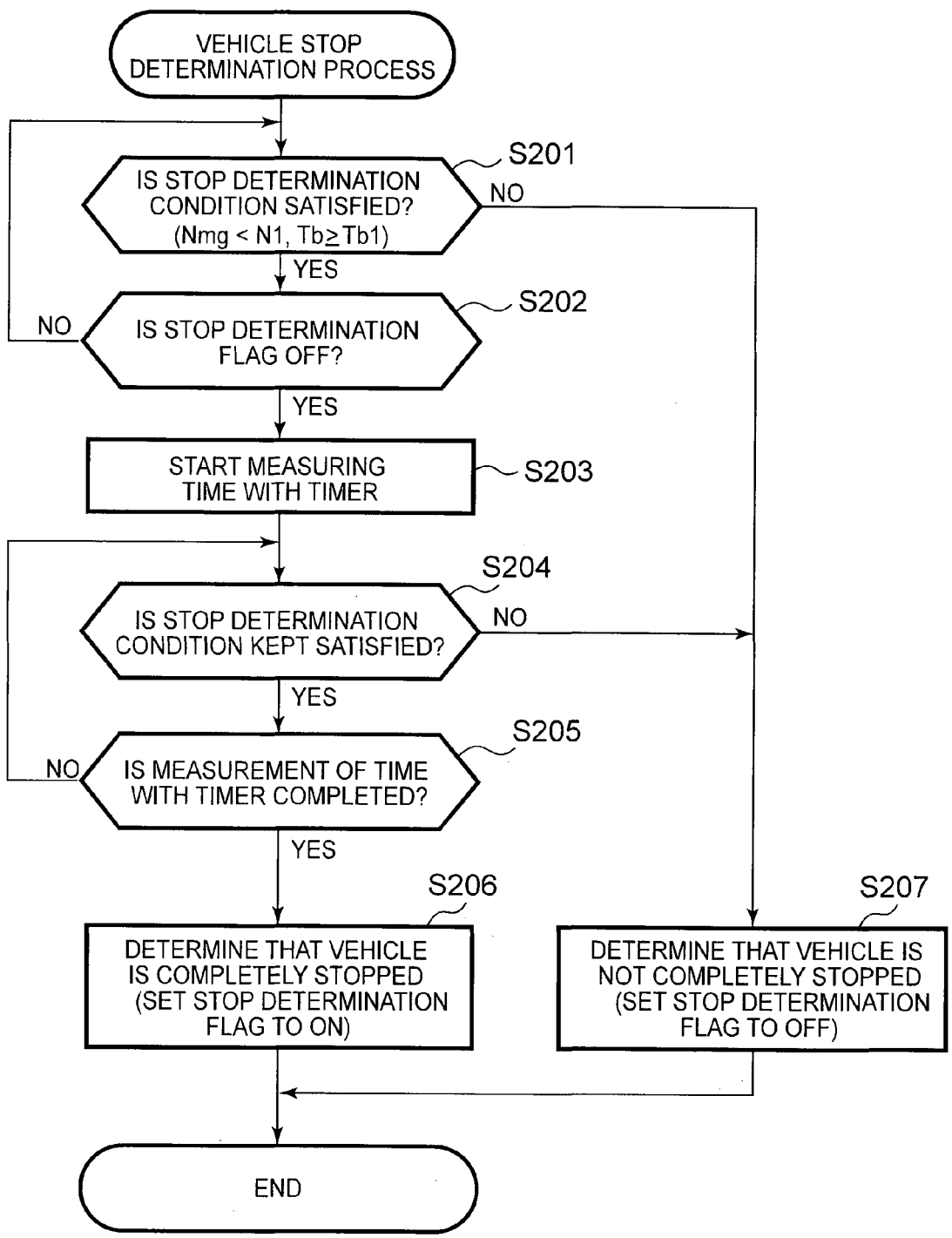
FIG. 12 is a flowchart of a vehicle stop determination process.

Next, a vehicle stop determination process will be described with reference to FIG. 12. FIG. 12 is a flowchart of the vehicle stop determination process. The vehicle stop determination process is a process for accurately determining whether the hybrid vehicle 1 is stopped, so as to, execute vehicle-stop-time inverter drive control as will be described later. The vehicle stop determination process is implemented when the HVECU 110 executes a control program stored in the ROM.

In FIG. 12, it is initially determined whether a stop determination condition is satisfied (step S201). In this embodiment, the stop determination condition is satisfied, when the MG rotational speed Nmg is lower than a predetermined value N1, and the brake pedal operation amount Tb is equal to or larger than a predetermined value Tb1. The case where this stop determination condition is satisfied in one example of "the case where the rotational speed of the electric motor is equal to or lower than a first threshold value, and an operation to stop the vehicle is performed".

If the stop determination condition is not satisfied (step S201: NO), the vehicle is in a non-stopped state (namely, not in a stopped state) (step S207). When it is determined that the vehicle is in the non-stopped state, a stop determination flag is set to OFF. If it is determined that the vehicle is in the non-stopped state, the vehicle stop determination process ends. The vehicle stop determination process is repeatedly executed at predetermined intervals, and the control returns to step S201 again when a predetermined length of time elapses after the end of one cycle of the process.

If, on the other hand, the stop determination condition is satisfied (step S201: YES), it is determined whether the stop determination flag is OFF (step S202). If the stop determination flag is ON (step S202: NO), the control returns to step S201.

If the stop determination flag is OFF (step S202: YES), measurement of time with a timer is started (step S203). The measurement time to be measured with the timer is a reference time that is experimentally, empirically or theoretically set in advance. Once the measurement of time with the timer is started, it is determined whether the vehicle is kept in a state where the stop determination condition is satisfied (step 204). If the stop determination condition ceases to be satisfied during measurement of time with the timer (step S204: NO), the control proceeds to step S207.

If the stop determination condition is satisfied (step S204: YES), it is determined whether the measurement of time with the timer is completed (step S205). Namely, in step S205, it is determined whether the vehicle has been kept in the condition where the stop determination condition is satisfied, for the above-mentioned reference time.

If the measurement of time with the timer is not completed (step S205: NO), namely, the duration for which the vehicle is kept in the condition where the stop determination condition is satisfied is still shorter than the reference time, the control returns to step S204.

If the measurement of time with the timer is completed (step S205: YES), it is determined that the hybrid vehicle 1 is stopped, and the stop determination flag is set to ON (step S206). If the stop determination flag is set to ON, the vehicle stop determination process is finished.

Figure 13:
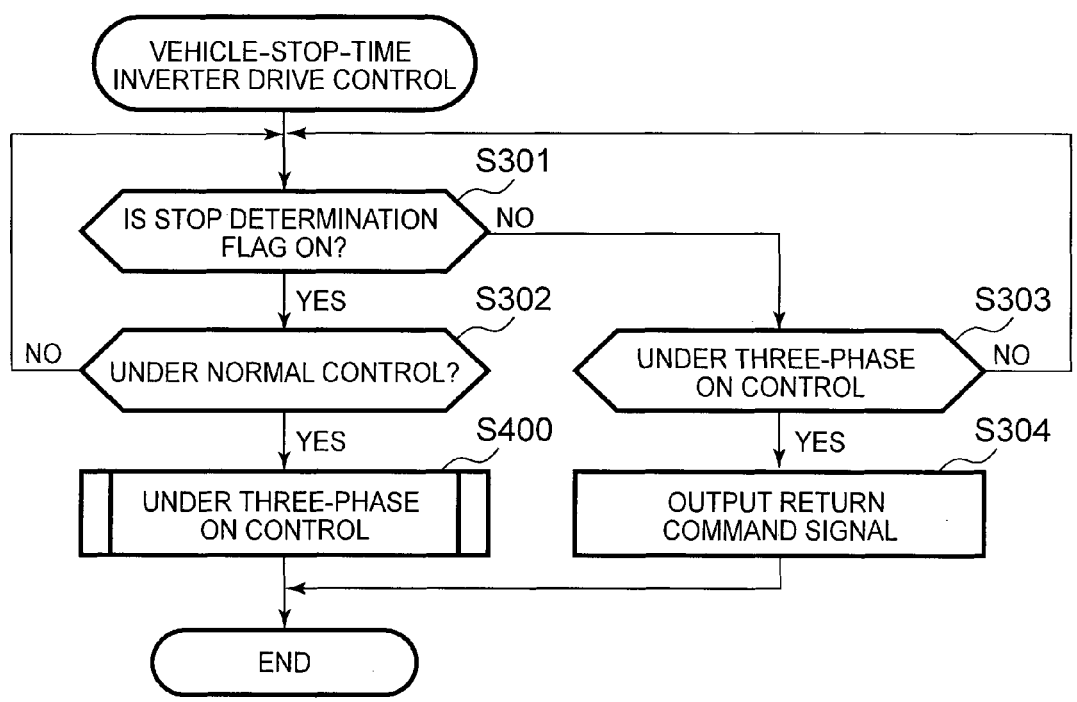
FIG. 13 is a flowchart of vehicle-stop-time inverter drive control.

Referring next to FIG. 13, vehicle-stop-time inverter drive control will be described. FIG. 13 is a flowchart of the vehicle-stop-time inverter drive control. The vehicle-stop-time inverter drive control is control for saving power consumption of the inverter 300 when the vehicle is stopped.

In FIG. 13, it is initially determined whether the stop determination flag is ON (step S301). If the stop determination flag is ON (step S301: YES), it is determined whether the inverter 300 is under normal control (step S302). The normal control comprises controls other than particular-phase ON control, for convenience, and refers to the above-described PWM control, for example. While the particular-phase ON control includes one-phase ON control, two-phase ON control, and three-phase ON control, the three-phase ON control will be described by way of example in this embodiment. When the inverter 300 is not under normal control (step S302: NO), namely, when the three-phase ON control is being executed, the control returns to step S301.

If, on the other hand, the stop determination flag is ON, and the inverter 300 is under normal control (step S302: YES), the HVECU 110 executes a three-phase ON process (step S400). The three-phase ON process is a process of controlling the manner of executing three-phase ON control. When the three-phase ON process ends, the vehicle-stop-time inverter drive control ends. The vehicle-stop-time inverter drive control is repeatedly executed at given intervals, similarly to the vehicle stop determination process as described above.

If, on the other hand, the stop determination flag is OFF in step S301 (step S301: NO), it is determined whether three-phase ON control is being executed (step S303). If the three-phase ON control is not executed (step S303: NO), the control returns to step S301.

If the three-phase ON control is executed in step S303 (step S303: YES), the HVECU 110 outputs a return command signal (step S304). If the return command signal is generated to the control bus 11, the vehicle-stop-time inverter drive control ends. If the return command signal is generated to the control bus 11, the vehicle-stop-time inverter drive control ends. With the return command signal thus generated to the control bus 11, the MGECU 120 terminates the three-phase ON control that is being executed, and returns the control mode of the inverter 300 to normal control. The vehicle-stop-time inverter drive control proceeds as described above.

Figure 14:
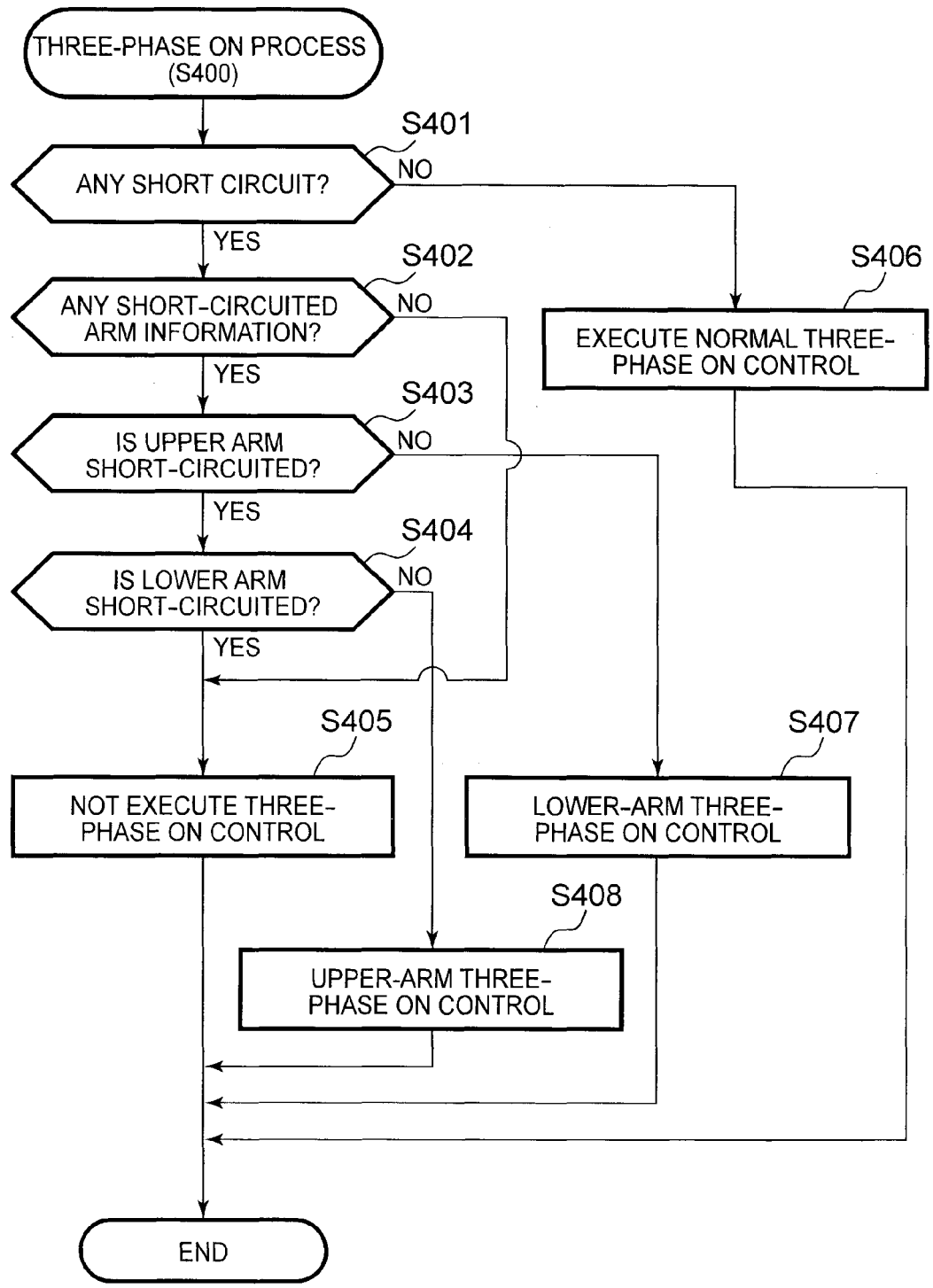
FIG. 14 is a flowchart of a three-phase ON process.

Referring to FIG. 14, the three-phase ON process will be described in detail. FIG. 14 is a flowchart of the three-phase ON process.

In FIG. 14, it is initially determined whether any short circuit occurs in the inverter 300 (step S401). Whether short circuit occurs or not is determined based on the status of the short-circuit detection flag set in the short-circuit detection process as described above.

If no short circuit occurs in the inverter 300 (step S401: NO), namely, if the short-circuit detection flag is OFF, the HVECU 110 instructs the MGECU 120 to execute normal three-phase ON control (step S406). If a normal three-phase ON command signal as a command for execution of normal three-phase ON control is generated to the control bus 11, the MGECU 120 performs the three-phase ON control on the inverter 300, in response to the normal three-phase ON command signal.

The three-phase ON control is control for placing either all of the upper arms (namely, positive-side switching devices, which are one example of the first switching devices according to the invention) of the U phase, W-phase and V phase of the inverter 300, or all of the lower arms (namely, negative-side switching devices, which are one example of the second switching devices according to the invention), in the OFF states, and placing all, of the other arms in the ON states. If the three-phase ON control is executed, no switching operation takes place in the inverter 300 while the vehicle is stopped; therefore, power consumption required for switching operation can be saved.

In the normal three-phase ON control, either the upper arms or the lower arms may be placed in the ON states, or a control logic for placing the upper arms or the lower arms in the ON states may be set in advance.

While the case where the particular-phase ON control is the three-phase ON control has been described above, the three-phase ON control described herein may be replaced as needed with two-phase ON control or one-phase ON, control, as a matter of course.

If it is confirmed in step S401 that short circuit occurs in the inverter 300 (step S401: YES), it is determined whether information concerning the short-circuited arm exists (step S402).

The information concerning the short-circuited arm does not exist in the following two cases. Namely, the first case is when no information concerning the short-circuited arm is included in the detailed short-circuit information as described above, namely, when multi-phase short circuit occurs in the inverter 30, and the second case is when the detailed short-circuit information, itself does not exist, namely, when the short-circuited phase determination condition is not satisfied.

If the information concerning the short-circuited arm does not exist (step S402: NO), the HVECU 110 instructs the MGECU 120 not to execute the three-phase ON control (step S405), and the three-phase ON process ends. Namely, when the short-circuited arm is not confirmed, it cannot be determined which of the upper and lower arms are subjected to switching operation to turn on the switching devices thereof, and therefore, the three-phase ON control is not executed.

When the information concerning the short-circuited arm exists (step, S402: YES), namely, when the short circuit that occurs in the inverter 300 is one-phase short circuit, it is determined whether any one of the upper arms is short-circuited (step S403). If none of the upper arms is short-circuited (step S403: NO), namely, if any one of the lower arms is short-circuited, lower-arm three-phase ON control is executed (step S407). The lower arm three-phase ON control is control for turning on all of the switching devices of the lower arms, and turning off all of the switching devices of the upper arms.

If, on the other hand, any one of the upper arms is short-circuited (step S403: YES), it is further determined whether any one of the lower arms is short-circuited (step S404). If the lower arm as well as the upper arm is short-circuited (step S404: YES), namely, if the upper and lower arms of one phase are short-circuited, the HVECU 110 instructs the MGECU 120 not to execute three-phase ON control (step S405), and the three-phase ON process ends. Namely, when the upper and lower arms are short-circuited, short circuit surely occurs in the upper and lower arms due to the three-phase ON control; therefore, the three-phase ON process is not performed.

If none of the lower arms is short-circuited in step S404 (step S404: NO), namely, if only the upper arm is short-circuited in the inverter 300, upper-arm three-phase ON control is executed (step S408). The upper-arm three-phase ON control is control for turning on all of the switching devices of the upper arms, and turning off all of the switching devices of the lower arms.

After the three-phase ON control (which is different from the normal three-phase ON control) performed by designating the arms of the three phases to be turned on is executed in step S407 or step S408, the three-phase ON process ends. The three-phase ON process is carried out as described above.

As explained above, according to the vehicle-stop-time inverter drive control of this embodiment, electric power required for switching of the inverter 300 under three-phase ON control while the hybrid vehicle 1 is stopped can be saved or reduced.

In particular, when short circuit occurs in one of the upper arms and the lower arms of the inverter 300, the arm in which the short circuit occurs is set as the ON-side arm under the three-phase ON control. Accordingly, electric insulation of the OFF-side arms can be ensured all the time, and the inverter 300 is safely operated under the three-phase ON control, so that the effect of saving power consumption while the vehicle is stopped can be maximized.

It is to be understood that the invention is not limited to the above-described embodiment, but may be changed as needed within such a range as not to depart from the principle or concept of the invention which can be read from the appended claims and the specification as a whole, and that vehicle control systems involving such changes are also included in the technical scope of the invention.

What is claimed is:

1. A control system for a vehicle, the vehicle including a three-phase AC motor operable to rotate in synchronization with a drive shaft of the vehicle, a first switching device and a second switching device that are electrically connected in series and provided for each of three phases of the three-phase AC motor, and a power converter configured to control turn-on and turn-off of the first switching device and the second switching device, the control system comprising:
   a short-circuit detector configured to detect short circuit in the first switching device and the second switching device; and
   an ECU configured to:
   (a) determine that the vehicle is stopped when a rotational speed of the three-phase AC motor is equal to or lower than a first threshold value and an operation to stop the vehicle is performed;
   (b) control the power converter when the ECU determines that the vehicle is stopped, so as to place the power converter in a predetermined condition in which one of the first switching device and the second switching device for all of the three phases is in an OFF state, and the other of the first switching device and the second switching device for at least one of the three phases is in an ON state; and
   (c) control the power converter when the short-circuit detector detects a short circuit in one of the first switching devices and the second switching devices so that all of the three phases are in the ON state when the vehicle is stopped, and so that said one of the first switching devices and the second switching devices in which the short circuit is detected is always in the ON state when the vehicle is stopped.

2. A method of controlling a vehicle, the vehicle including a three-phase AC motor operable to rotate in synchronization with a drive shaft of the vehicle, a first switching device and a second switching device that are electrically connected in series and provided for each of three phases of the three-phase AC motor, a power converter operable to control turn-on and turn-off of the first switching device and the second switching device, a short-circuit detector configured to detect short circuit in the first switching device and the second switching device, and an ECU, the method comprising:
   determining, by the ECU, that the vehicle is stopped when a rotational speed of the three-phase AC motor is equal to or lower than a first threshold value and an operation to stop the vehicle is performed;
   controlling, by the ECU, the power converter when it is determined that the vehicle is stopped, so as to place the power converter in a predetermined condition in which one of the first switching device and the second switching device for all of the three phases is in an OFF state, and the other of the first switching device and the second switching device for at least one of the three phases is in an ON state; and
   controlling, by the ECU, the power converter when the short-circuit detector detects a short circuit in one of the first switching devices and the second switching devices so that all of the three phases are in the ON state when the vehicle is stopped, and, so that said one of the first switching devices and the second switching devices in which the short circuit is detected is always in the ON state when the vehicle is stopped.

* * * * *